(12) United States Patent
Mansour et al.

(10) Patent No.: US 12,684,380 B2
(45) Date of Patent: Jul. 14, 2026

(54) PERFORMANCE IN VOICE OVER INTERNET PROTOCOL AND VOICE OVER NEW RADIO

(71) Applicant: T-MOBILE INNOVATIONS LLC, Overland Park, KS (US)

(72) Inventors: Nagi A. Mansour, Arlington, VA (US); Akin Ozozlu, McLean, VA (US); Ferdinand Bacay Saulon, Issaquah, WA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 802 days.

(21) Appl. No.: 18/074,321

(22) Filed: Dec. 2, 2022

(65) Prior Publication Data

US 2024/0187890 A1 Jun. 6, 2024

(51) Int. Cl.
*H04W 24/08* (2009.01)
*H04B 17/336* (2015.01)

(52) U.S. Cl.
CPC .......... *H04W 24/08* (2013.01); *H04B 17/336* (2015.01)

(58) Field of Classification Search
CPC ............................ H04W 24/08; H04B 17/336
See application file for complete search history.

(56) References Cited

U.S. PATENT DOCUMENTS

| | | | |
|---|---|---|---|
| 2005/0143979 A1* | 6/2005 | Lee | G10L 19/24 704/E19.044 |
| 2009/0003300 A1* | 1/2009 | Wang | H04B 7/022 370/340 |

FOREIGN PATENT DOCUMENTS

| | | | | |
|---|---|---|---|---|
| EP | 1901495 A1 * | 3/2008 | ......... | H04L 65/1083 |
| WO | WO-9838631 A1 * | 9/1998 | ............. | G10L 19/18 |

* cited by examiner

*Primary Examiner* — Marisol Figueroa
(74) *Attorney, Agent, or Firm* — SHOOK, HARDY & BACON L.L.P.

(57) ABSTRACT
Aspects provided herein provide methods, systems, and a non-transitory computer storage medium storing computer instructions for dynamic assignment of voice frames in a network. The method begins with measuring a radio frequency (RF) condition metric for a user equipment (UE). The RF condition metric is then compared with a predetermined frame assignment threshold. Based on the comparison, a number of voice frames are dynamically assigned to be sent to the UE.

20 Claims, 5 Drawing Sheets

400

402 — MEASURING A RADIO FREQUENCY (RF) SIGNAL CONDITION METRIC FOR A USER EQUIPMENT (UE)

404 — COMPARING THE RF SIGNAL CONDITION METRIC WITH A PREDETERMINED FRAME ASSIGNMENT THRESHOLD

406 — BASED ON THE COMPARING, DETERMINE A QUANTITY OF VOICE FRAMES TO BE SENT TO THE UE

408 — DYNAMICALLY ASSIGNING THE QUANTITY OF VOICE FRAMES TO THE UE

200

400

402 — MEASURING A RADIO FREQUENCY (RF) SIGNAL CONDITION METRIC FOR A USER EQUIPMENT (UE)

404 — COMPARING THE RF SIGNAL CONDITION METRIC WITH A PREDETERMINED FRAME ASSIGNMENT THRESHOLD

406 — BASED ON THE COMPARING, DETERMINE A QUANTITY OF VOICE FRAMES TO BE SENT TO THE UE

408 — DYNAMICALLY ASSIGNING THE QUANTITY OF VOICE FRAMES TO THE UE

PERFORMANCE IN VOICE OVER INTERNET PROTOCOL AND VOICE OVER NEW RADIO

BACKGROUND

In both voice over internet protocol (VoIP) and voice over new radio (VoNR) voice quality is related to the number of frames sent. The number of frames sent to a user to form the call is constant. While a constant number of frames facilitates call management within a network it can produce inconsistent user experiences. A user further away from a serving cell of the network may experience call degradation and unintelligibility. Call degradation may include delay. A user close to the serving cell may experience excellent call quality, but the network is devoting resources that are not needed to the nearby user.

SUMMARY

A high-level overview of various aspects of the present technology is provided in this section to introduce a selection of concepts that are further described below in the detailed description section of this disclosure. This summary is not intended to identify key or essential features of the claimed subject matter, nor is it intended to be used as an aid in isolation to determine the scope of the claimed subject matter.

According to aspects herein, methods and systems for dynamic assignment of voice frames in a network is provided. The method begins with measuring a radio frequency (RF) signal condition metric for a user equipment (UE). The RF signal condition metric is then compared with a predetermined frame assignment threshold. Based on the comparison, a number of voice frames are dynamically assigned to be sent to the UE.

In a further embodiment, a method of dynamic assignment of voice frames is provided. The method begins with transmitting an RF signal condition metric to a network element. The method then continues with the device receiving a dynamically assigned number of voice frames based on a comparison of the RF signal condition metric with a predetermined frame assignment threshold.

An additional embodiment provides a non-transitory computer storage media storing computer-useable instructions that, when executed by one or more processors cause the processors to measure an RF signal condition metric for a UE. The processors then compare the RF condition metric with a predetermined frame assignment threshold. Based on the comparison, the processors then dynamically assign a number of voice frames to be sent to the UE.

BRIEF DESCRIPTION OF THE SEVERAL VIEWS OF THE DRAWINGS

Implementations of the present disclosure are described in detail below with reference to the attached drawing figures, wherein.

DETAILED DESCRIPTION

Figure 1:
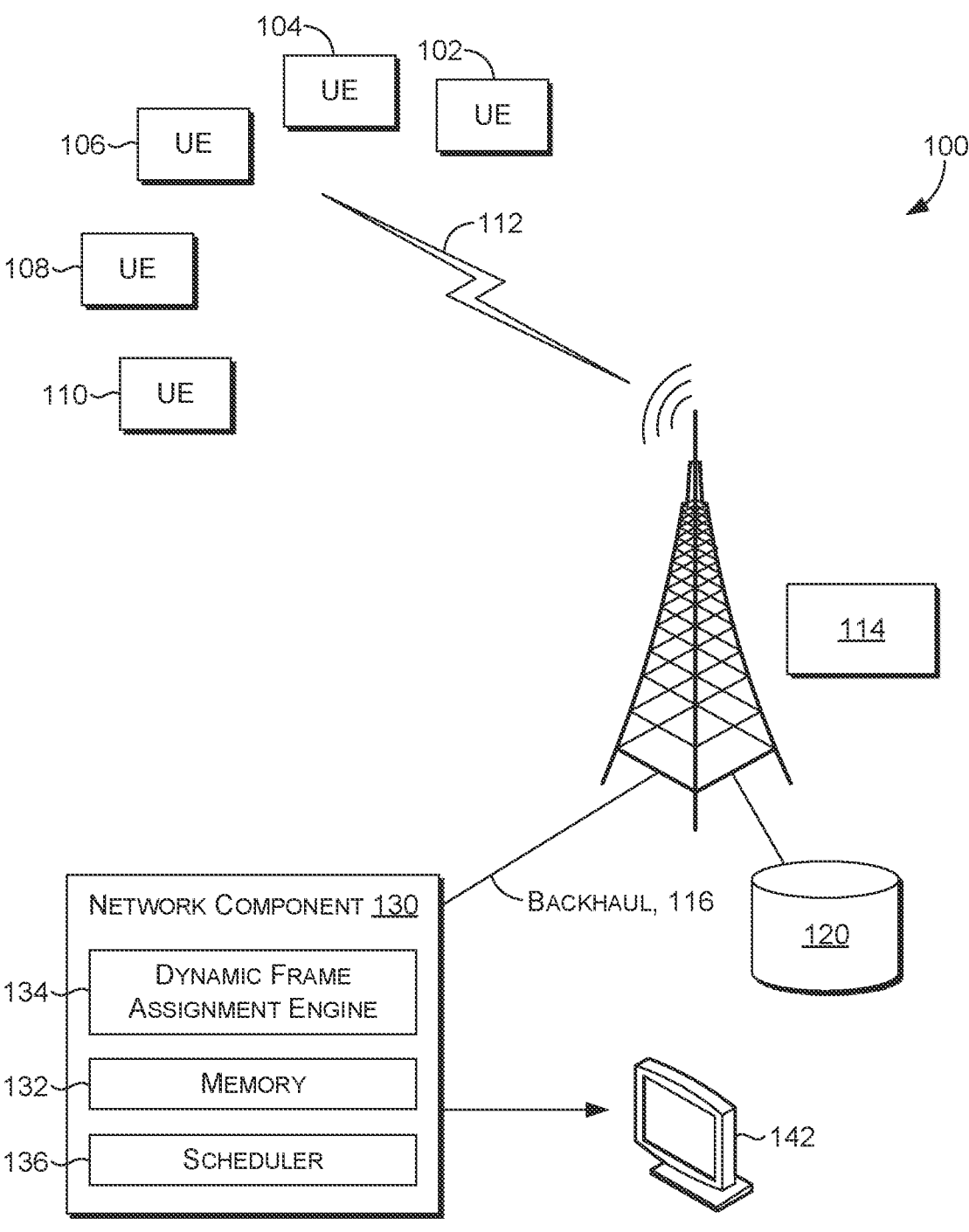
FIG. 1 depicts a diagram of an exemplary network environment in which implementations of the present disclosure may be employed, in accordance with aspects herein.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

3G Third-Generation Wireless Technology
4G Fourth-Generation Cellular Communication System
5G Fifth-Generation Cellular Communication System
6G Sixth-Generation Cellular Communication System
AI Artificial Intelligence
CD-ROM Compact Disk Read Only Memory
CDMA Code Division Multiple Access
eNodeB Evolved Node B
GIS Geographic/Geographical/Geospatial Information System
gNodeB Next Generation Node B
GPRS General Packet Radio Service
GSM Global System for Mobile communications
iDEN Integrated Digital Enhanced Network
DVD Digital Versatile Discs
EEPROM Electrically Erasable Programmable Read Only Memory
LED Light Emitting Diode
LTE Long Term Evolution
MIMO Multiple Input Multiple Output
MD Mobile Device
ML Machine Learning
PC Personal Computer
PCS Personal Communications Service
PDA Personal Digital Assistant
PDSCH Physical Downlink Shared Channel
PHICH Physical Hybrid ARQ Indicator Channel
PUCCH Physical Uplink Control Channel
PUSCH Physical Uplink Shared Channel
RAM Random Access Memory
RET Remote Electrical Tilt
RF Radio-Frequency
RFI Radio-Frequency Interference
R/N Relay Node RNR Reverse Noise Rise
ROM Read Only Memory
RSRP Reference Signal Received Power
RSRQ Reference Signal Received Quality
RSSI Received Signal Strength Indicator
SINR Signal-to-Interference-Plus-Noise Ratio
SNR Signal-to-noise ratio
SON Self-Organizing Networks
TDMA Time Division Multiple Access
TXRU Transceiver (or Transceiver Unit)
UE User Equipment
UMTS Universal Mobile Telecommunications Systems
WCD Wireless Communication Device (interchangeable with UE)

Further, various technical terms are used throughout this description. An illustrative resource that fleshes out various aspects of these terms can be found in Newton's Telecom Dictionary, 25th Edition (2009).

Embodiments of the present technology may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media.

Computer-readable media include both volatile and non-volatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, a traditional telecommunications network employs a plurality of base stations (i.e., nodes, cell sites, cell towers) to provide network coverage. The base stations are employed to broadcast and transmit transmissions to user devices of the telecommunications network. An base station may be considered to be a portion of a base station that may comprise an antenna, a radio, and/or a controller. In aspects, a base station is defined by its ability to communicate with a user equipment (UE), such as a wireless communication device (WCD), according to a single protocol (e.g., 3G, 4G, LTE, 5G, or 6G, and the like); however, in other aspects, a single base station may communicate with a UE according to multiple protocols. As used herein, a base station may comprise one base station or more than one base station. Factors that can affect the telecommunications transmission include, e.g., location and size of the base stations, and frequency of the transmission, among other factors. The base stations are employed to broadcast and transmit transmissions to user devices of the telecommunications network. Traditionally, the base station establishes uplink (or downlink) transmission with a mobile handset over a single frequency that is exclusive to that particular uplink connection (e.g., an LTE connection with an EnodeB). In this regard, typically only one active uplink connection can occur per frequency. The base station may include one or more sectors served by individual transmitting/receiving components associated with the base station (e.g., antenna arrays controlled by an EnodeB). These transmitting/receiving components together form a multi-sector broadcast arc for communication with mobile handsets linked to the base station.

As used herein, "base station" is one or more transmitters or receivers or a combination of transmitters and receivers, including the accessory equipment, necessary at one location for providing a service involving the transmission, emission, and/or reception of radio waves for one or more specific telecommunication purposes to a mobile station (e.g., a UE), wherein the base station is not intended to be used while in motion in the provision of the service. The term/abbreviation UE (also referenced herein as a user device or wireless communications device (WCD)) can include any device employed by an end-user to communicate with a telecommunications network, such as a wireless telecommunications network. A UE can include a mobile device, a mobile broadband adapter, or any other communications device employed to communicate with the wireless telecommunications network. A UE, as one of ordinary skill in the art may appreciate, generally includes one or more antennas coupled to a radio for exchanging (e.g., transmitting and receiving) transmissions with a nearby base station. A UE may be, in an embodiment, similar to device 500 described herein with respect to FIG. 5.

As used herein, UE (also referenced herein as a user device or a wireless communication device) can include any device employed by an end-user to communicate with a wireless telecommunications network. A UE can include a mobile device, a mobile broadband adapter, a fixed location or temporarily fixed location device, or any other communications device employed to communicate with the wireless telecommunications network. For an illustrative example, a UE can include cell phones, smartphones, tablets, laptops, small cell network devices (such as micro cell, pico cell, femto cell, or similar devices), and so forth. Further, a UE can include a sensor or set of sensors coupled with any other communications device employed to communicate with the wireless telecommunications network; such as, but not limited to, a camera, a weather sensor (such as a rain gage, pressure sensor, thermometer, hygrometer, and so on), a motion detector, or any other sensor or combination of sensors. A UE, as one of ordinary skill in the art may appreciate, generally includes one or more antennas coupled to a radio for exchanging (e.g., transmitting and receiving) transmissions with a nearby base station.

In aspects, a UE provides UE data including location and channel quality information to the wireless communication network via the base station. Location information may be based on a current or last known position utilizing GPS or other satellite location services, terrestrial triangulation, an base station's physical location, or any other means of obtaining coarse or fine location information. Channel quality information may indicate a realized uplink and/or downlink transmission data rate, observed signal-to-interference-plus-noise ratio (SINR) and/or signal strength at the user device, or throughput of the connection. Channel quality information may be provided via, for example, an uplink pilot time slot, downlink pilot time slot, sounding reference signal, channel quality indicator (CQI), rank indicator, precoding matrix indicator, or some combination thereof. Channel quality information may be determined to be satisfactory or unsatisfactory, for example, based on exceeding or being less than a threshold. Location and channel quality information may take into account the user device capability, such as the number of antennas and the type of receiver used for detection. Processing of location and channel quality information may be done locally, at the base station or at the individual antenna array of the base station. In other aspects, the processing of said information may be done remotely.

A service state of the UEs may include, for example, an in-service state when a UE is in-network (i.e., using services of a primary provider to which the UE is subscribed to, otherwise referred to as a home network carrier), or when the UE is roaming (i.e., using services of a secondary provider providing coverage to the particular geographic location of the UE that has agreements in place with the primary provider of the UE). The service state of the UE may also include, for example, an emergency only state when the UE is out-of-network and there are no agreements in place between the primary provider of the UE and the secondary provider providing coverage to the current geographic location of the UE. Finally, the service state of the UE may also include, for example, an out of service state when there are no service providers at the particular geographic location of the UE.

The UE data may be collected at predetermined time intervals measured in milliseconds, seconds, minutes, hours, or days. Alternatively, the UE data may be collected continuously. The UE data may be stored at a storage device of the UE, and may be retrievable by the UE's primary provider as needed and/or the UE data may be stored in a cloud based storage database and may be retrievable by the UE's primary provider as needed. When the UE data is stored in the cloud based storage database, the data may be stored in association with a data identifier mapping the UE data back to the UE, or alternatively, the UE data may be collected without an identifier for anonymity.

In accordance with a first aspect of the present disclosure a method of dynamic assignment of voice frames in a network. The method begins with measuring an RF signal condition metric for a UE. The RF signal condition metric is then compared with a predetermined frame assignment threshold. Based on the comparison, a number of voice frames are dynamically assigned to be sent to the UE.

A second aspect of the present disclosure provides a method of dynamic assignment of voice frames. The method begins with transmitting an RF signal condition metric to a network element. The device then receives a dynamically assigned number of voice frames based on a comparison of the RF signal condition metric with a predetermined frame assignment threshold.

Another aspect of the present disclosure is directed to a non-transitory computer storage media storing computer-useable instructions that, when used by one or more processors, cause the processors to measure an RF signal condition metric for a UE. The processors then compare the RF signal condition metric with a predetermined frame assignment threshold. Based on the comparison, the processors dynamically assign a number of voice frames to the UE.

FIG. 1 illustrates an example of a network environment 100 suitable for use in implementing embodiments of the present disclosure. The network environment 100 is but one example of a suitable network environment and is not intended to suggest any limitation as to the scope of use or functionality of the disclosure. Neither should the network environment 100 be interpreted as having any dependency or requirement to any one or combination of components illustrated.

Network environment 100 includes UE devices 102, 104, 106, 108, and 110, base station 114 (which may be a cell site or the like), and one or more communication channels 112. The communication channels 112 can communicate over frequency bands assigned to the carrier. In network environment 100, UE devices may take on a variety of forms, such as a personal computer (PC), a user device, a smart phone, a smart watch, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, a hotspot, an extended reality device, and any combination of these delineated devices, or any other device (such as the computing device (500) that communicates via wireless communications with the base station 114 in order to interact with a public or private network.

Figure 5:
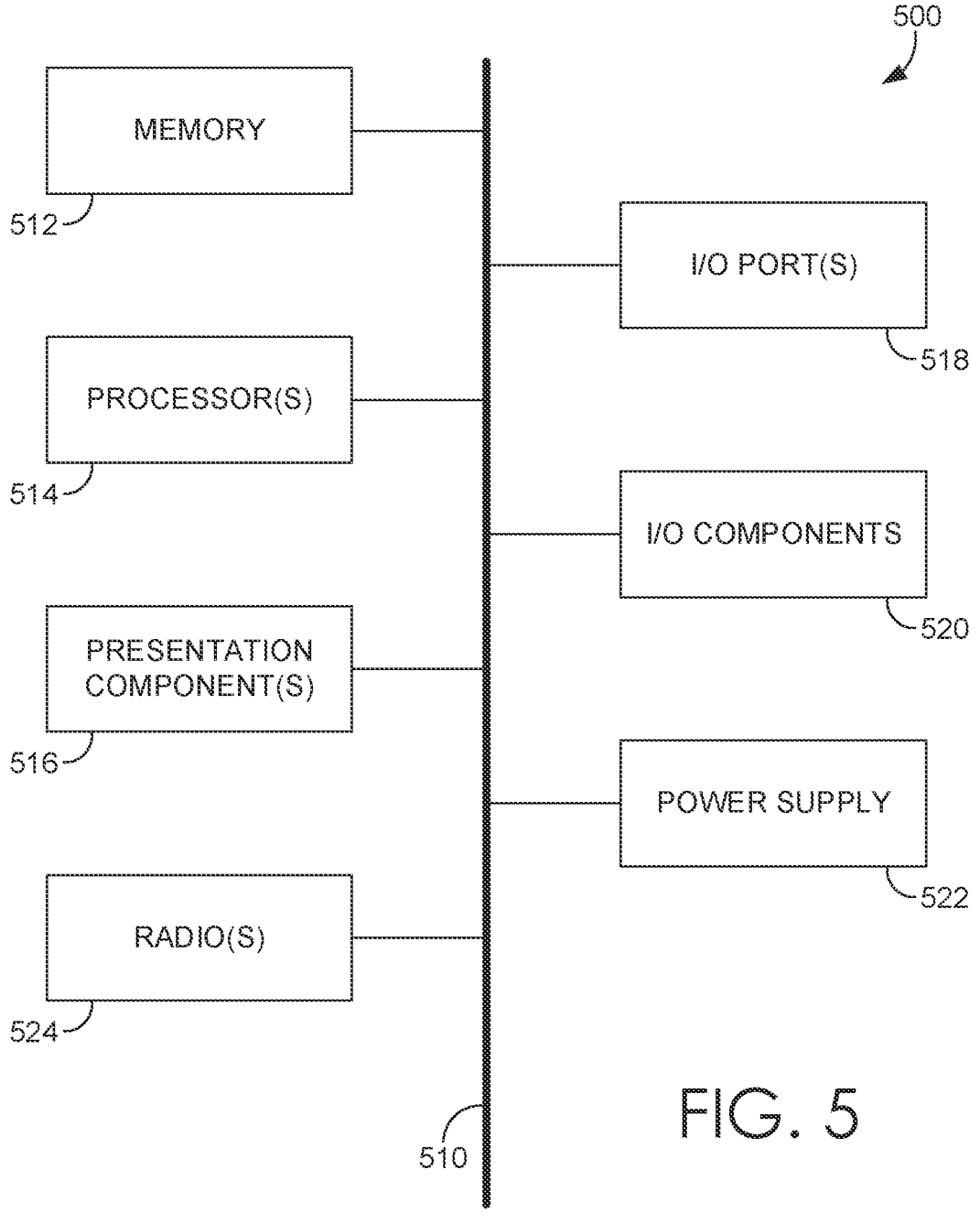
FIG. 5 depicts an exemplary computing device suitable for use in implementations of the present disclosure, in accordance with aspects herein.

In some aspects, each of the UEs 102, 104, 106, 108, and 110 may correspond to computing device 500 in FIG. 5. Thus, a UE can include, for example, a display(s), a power source(s) (e.g., a battery), a data store(s), a speaker(s), memory, a buffer(s), a radio(s) and the like. In some implementations, for example, devices such the UEs 102, 104, 106, 108, and 110 comprise a wireless or mobile device with which a wireless telecommunication network(s) can be utilized for communication (e.g., voice and/or data communication). In this regard, the user device can be any mobile computing device that communicates by way of a wireless network, for example, a 3G, 4G, 5G, LTE, CDMA, or any other type of network.

In some cases, UEs 102, 104, 106, 108, and 110 in network environment 100 can optionally utilize one or more communication channels 112 to communicate with other computing devices (e.g., a mobile device(s), a server(s), a personal computer(s), etc.) through base station 114. Base station 114 may be a gNodeB in a 5G or 6G network.

The network environment 100 may be comprised of a telecommunications network(s), or a portion thereof. A telecommunications network might include an array of devices or components (e.g., one or more base stations), some of which are not shown. Those devices or components may form network environments similar to what is shown in FIG. 1, and may also perform methods in accordance with the present disclosure. Components such as terminals, links, and nodes (as well as other components) can provide connectivity in various implementations. Network environment 100 can include multiple networks, as well as being a network of networks, but is shown in more simple form so as to not obscure other aspects of the present disclosure.

The one or more communication channels 112 can be part of a telecommunication network that connects subscribers to their immediate telecommunications service provider (i.e., home network carrier). In some instances, the one or more communication channels 112 can be associated with a telecommunications provider that provides services (e.g., 3G network, 4G network, LTE network, 5G network, 6G network, and the like) to user devices, such as UEs 102, 104, 106, 108, and 110. For example, the one or more communication channels may provide voice, SMS, and/or data services to UEs 102, 104, 106, 108, and 110, or corresponding users that are registered or subscribed to utilize the services provided by the telecommunications service provider. The one or more communication channels 112 can comprise, for example, a 1× circuit voice, a 3G network (e.g., CDMA, CDMA2000, WCDMA, GSM, UMTS), a 4G network (WiMAX, LTE, HSDPA), a 5G network or a 6G network.

In some implementations, base station 114 is configured to communicate with a UE, such as UEs 102, 104, 106, 108, and 110, that are located within the geographic area, or cell, covered by radio antennas of base station 114. Base station 114 may include one or more base stations, base transmitter stations, radios, antennas, antenna arrays, power amplifiers, transmitters/receivers, digital signal processors, control electronics, GPS equipment, and the like. In particular, base station 114 may selectively communicate with the user devices using dynamic beamforming.

As shown, base station 114 is in communication with a network component 130 and at least a network database 120 via a backhaul channel 116. As the UEs 102, 104, 106, 108, and 110 collect individual status data, the status data can be automatically communicated by each of the UEs 102, 104, 106, 108, and 110 to the base station 114. Base station 114 may store the data communicated by the UEs 102, 104, 106, 108, and 110 at a network database 120. Alternatively, the base station 114 may automatically retrieve the status data from the UEs 102, 104, 106, 108, and 110, and similarly store the data in the network database 120. The data may be communicated or retrieved and stored periodically within a predetermined time interval which may be in seconds, minutes, hours, days, months, years, and the like. With the incoming of new data, the network database 120 may be refreshed with the new data every time, or within a predetermined time threshold so as to keep the status data stored in the network database 120 current. For example, the data may be received at or retrieved by the base station 114 every 10 minutes and the data stored at the network database 120 may be kept current for 30 days, which means that status data that is older than 30 days would be replaced by newer status data at 10 minute intervals. As described above, the status data collected by the UEs 102, 104, 106, 108, and 110 can include, for example, service state status, the respective UE's current geographic location, a current time, a strength of the wireless signal, available networks, and the like.

The network component 130 comprises a memory 132, a dynamic frame assignment engine 134, and a scheduler 136. All determinations, calculations, and data further generated by the dynamic frame assignment engine 134, and scheduler 136 may be stored at the memory 132 and also at the data store 140. Although the network component 130 is shown as a single component comprising the memory 132, dynamic frame assignment engine 134, and the scheduler 136, it is also contemplated that each of the memory 132, dynamic frame assignment engine 134, and scheduler 136 may reside at different locations, be its own separate entity, and the like, within the home network carrier system.

The network component 130 is configured to retrieve signal information, UE device information, slot configuration, latency information, including quality of service (QOS) information, and metrics from the base station 114 or one of the UE devices 102, 104, 106, 108, and 110. The information may also include radio frequency (RF) signal quality information, such as signal to interference and noise (SINR) ratio. UE device information can include a device identifier and data usage information. The dynamic frame assignment engine can monitor the activity and RF signal quality information from UEs 102, 104, 106, 108, and 110. The dynamic frame assignment engine determines the number of voice frames to assign to each of the UEs 102, 104, 106, 108, and 110 and informs the scheduler. The scheduler 136 informs UEs 102, 104, 106, 108, and 110 of the number of voice frames assigned and also informs the UEs when the number of voice frames assigned changes dynamically based on RF signal quality.

Figure 2:
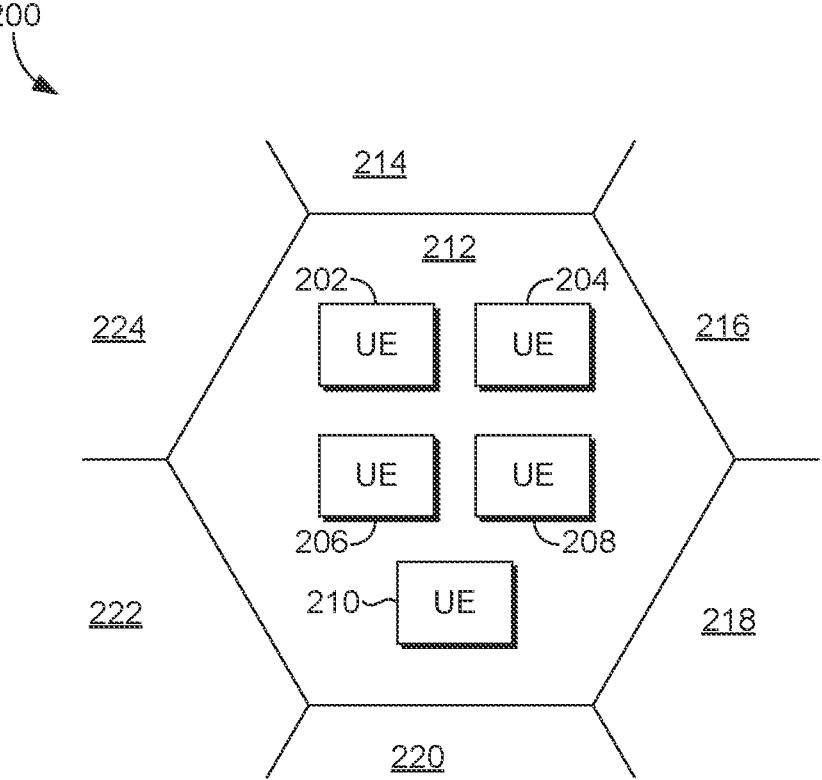
FIG. 2 depicts a cellular network suitable for use in implementations of the present disclosure, in accordance with aspects herein.

FIG. 2 depicts a cellular network suitable for use in implementations of the present disclosure, in accordance with aspects herein. For example, as shown in FIG. 2, each geographic area in the plurality of geographic areas may have a hexagonal shape such as hexagon representing a geographic area 200 having cells 212, 214, 216, 218, 220, 222, 224, each including base station or base station 114, backhaul channel 116, antenna for sending and receiving signals over communication channels 112, network database 120 and network component 130. The size of the geographic area 200 may be predetermined based on a level of granularity, detail, and/or accuracy desired for the determinations/calculations done by the systems, computerized methods, and computer-storage media. A plurality of UEs may be located within each geographic area collecting UE data within the geographic area at a given time. For example, as shown in FIG. 2, UEs 202, 204, 206, 208, and 210, may be located within geographic area 200 collecting UE data that is useable by network component 130, in accordance with aspects herein. UEs 202, 204, 206, 208, and 210 can move within the cell currently occupying, such as cell 212 and can move to other cells such as adjoining cells 214, 216, 218, 220, 222 and 224.

Figure 3:
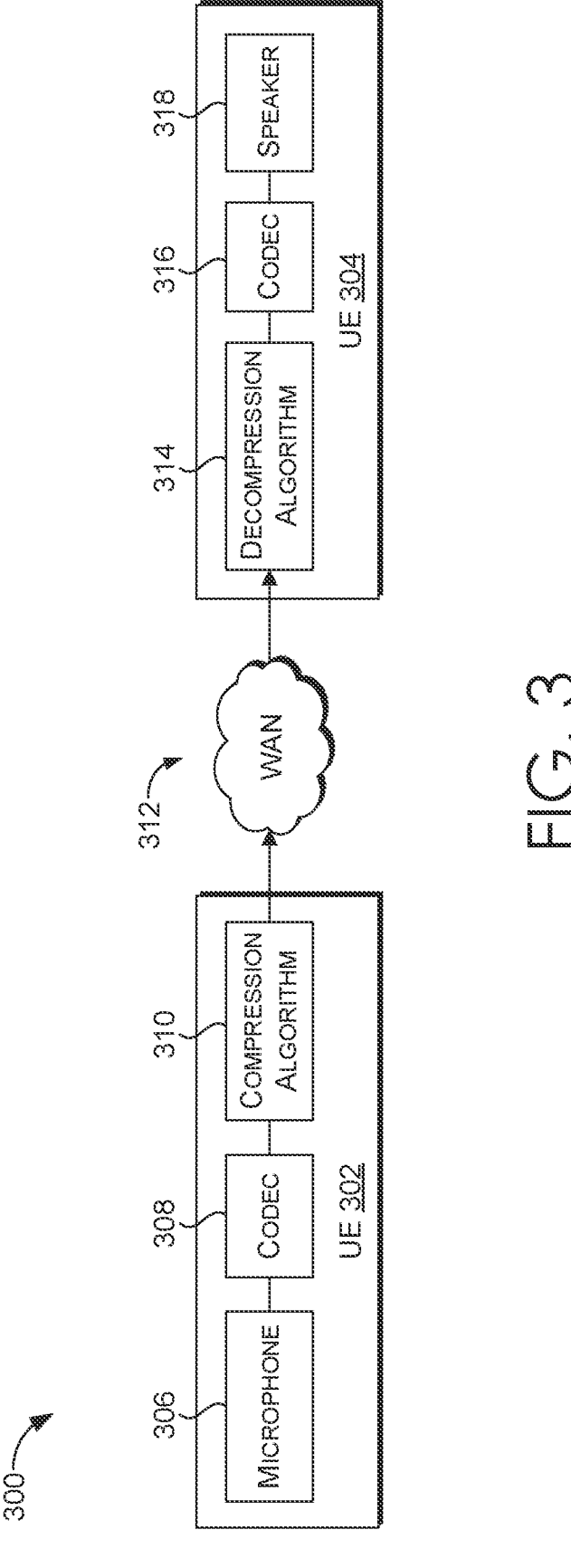
FIG. 3 depicts a flow of a compressed voice circuit, in which implementations of the present disclosure may be employed, in accordance with aspects herein.

FIG. 3 depicts a flow of a compressed voice circuit, in which implementations of the present disclosure may be employed, in accordance with aspects herein. The system 300 includes a first UE 302 and a second UE 304. The first UE 302 is sending a VoIP message to the second UE 304. The VoIP message can be sent over a wide area network (WAN) 312. If the voice message was sent using NR a base station, such as an eNB would be used in place of WAN 312. The user of the first UE 302 speaks into microphone 306 which transmits an analog signal to a voice coder-decoder (CODEC) 308. The CODEC 308 digitizes the analog signal to create pulse code modulated (PCM) samples. The PCM samples from CODEC 308 are input to compression algorithm 310. The compression algorithm compresses the PCM samples into a packet format for transmission across the WAN 312. The WAN 312 delivers the packets to the second UE 304. Upon receipt of the packets, a decompression algorithm 314 decompresses the packets and passes them to CODEC 316 which decodes the packets into an analog signal and passes the analog signal to a speaker 318 for output.

Figure 4:
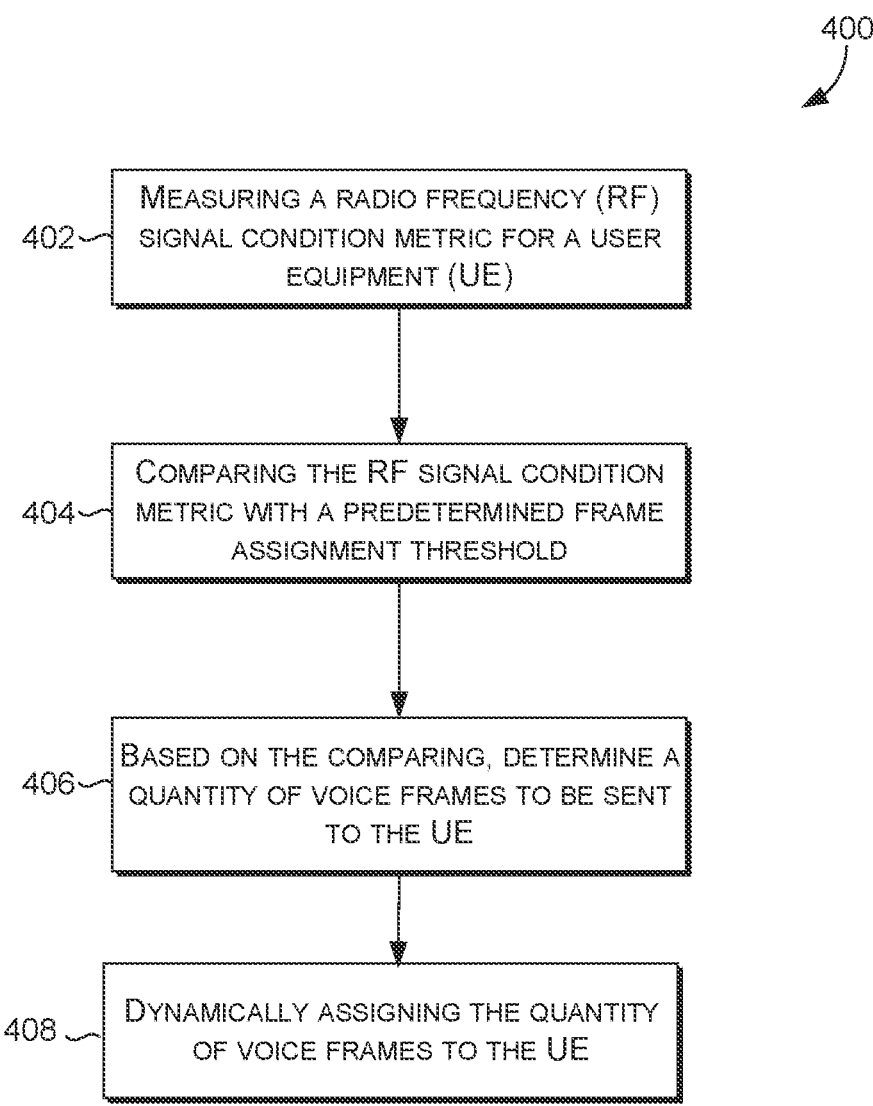
FIG. 4 is a flow diagram of an exemplary method of dynamic assignment of voice frames in an exemplary network environment, in which aspects of the present disclosure may be employed, in accordance with aspects herein.

FIG. 4 is a flow diagram of an exemplary method of dynamic assignment of voice frames in an exemplary network environment. The method 400 begins in step 402 with measuring an RF signal condition metric for a UE. The method continues in step 404 with comparing the RF signal condition metric with a predetermined frame assignment threshold. The RF signal condition metric may be a SINR measurement and may include a distance measurement, with the distance measured from a network element or a WAN.

The method then continues with step 406 based on the comparison, dynamically assigning a number of voice frames to be sent to the UE.

The predetermined frame assignment metric may be a SINR measurement and may also be a measure of distance between the UE and a network element. The distance may also be measured between the UE and a WAN. Based on the comparison, a number of voice frames to be sent to the UE may be decreased if the SINR measurement exceeds the predetermined frame assignment threshold. Conversely, if the SINR measurement is less than the predetermined frame assignment threshold, the number of voice frames assigned to the UE may be increased. The number of voice frames assigned to the UE may be decreased if the UE is near to a network element or WAN. As the UE moves closer to the network element or the WAN the number of voice frames assigned to the UE may be decreased. The predetermined frame assignment threshold may use a distance measurement in conjunction with the RF signal condition metric. Alternately, the RF signal condition metric or a distance measurement of the UE from a network element or WAN may be used independently.

FIG. 5 depicts an exemplary computing device suitable for use in implementations of the present disclosure, in accordance with aspects herein. With continued reference to FIG. 5, computing device 500 includes bus 502 that directly or indirectly couples the following devices: memory 504, one or more processors 506, one or more presentation components 508, input/output (I/O) ports 512, I/O components 510, radio 516, transmitter 518, and power supply 514. Bus 502 represents what may be one or more busses (such as an address bus, data bus, or combination thereof). Although the devices of FIG. 5 are shown with lines for the sake of clarity, in reality, delineating various components is not so clear, and metaphorically, the lines would more accurately be grey and fuzzy. For example, one may consider a presentation component such as a display device to be one of I/O components 510. Also, processors, such as one or more processors 506, have memory. The present disclosure hereof recognizes that such is the nature of the art, and reiterates that FIG. 5 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 5 and refer to "computer" or "computing device."

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

Computing device 500 typically includes a variety of computer-readable media. Computer-readable media can be any available media that can be accessed by computing device 500 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 504 includes computer-storage media in the form of volatile and/or nonvolatile memory. Memory 504 may be removable, nonremovable, or a combination thereof. Exemplary memory includes solid-state memory, hard drives, optical-disc drives, etc. Computing device 500 includes one or more processors 506 that read data from various entities such as bus 502, memory 504 or I/O components 510. One or more presentation components 508 present data indications to a person or other device. Exemplary one or more presentation components 508 include a display device, speaker, printing component, vibrating component, etc. I/O ports 512 allow computing device 500 to be logically coupled to other devices including I/O components 510, some of which may be built into computing device 500. Illustrative I/O components 510 include a microphone, joystick, game pad, satellite dish, scanner, printer, wireless device, etc.

The radio 516 represents one or more radios that facilitate communication with a wireless telecommunications network. While a single radio 516 is shown in FIG. 5, it is contemplated that there may be more than one radio 516 coupled to the bus 502. In aspects, the radio 516 utilizes a transmitter 518 to communicate with the wireless telecommunications network. It is expressly conceived that a computing device with more than one radio 516 could facilitate communication with the wireless telecommunications network via both the first transmitter 518 and an additional transmitters (e.g. a second transmitter). Illustrative wireless telecommunications technologies include CDMA, GPRS, TDMA, GSM, and the like. The radio 516 may additionally or alternatively facilitate other types of wireless communications including Wi-Fi, WiMAX, LTE, 3G, 4G, LTE, 5G, NR, VOLTE, or other VoIP communications. As can be appreciated, in various embodiments, radio 516 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even base stations (as well as other components) can provide wireless connectivity in some embodiments.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A method of dynamic assignment of voice frames in a network, the method comprising:

measuring a radio frequency (RF) signal condition metric for a user equipment (UE);

comparing the RF signal condition metric with a predetermined frame assignment threshold; and based on the comparing, dynamically assigning a number of voice frames to be sent to the UE.

2. The method of claim 1, wherein the predetermined frame assignment metric is a signal to interference and noise (SINR) measurement.

3. The method of claim 1, wherein the predetermined frame assignment metric is a measure of distance between the UE and a network element.

4. The method of claim 1, wherein the predetermined frame assignment metric is a measure of distance between the UE and a wide area network (WAN).

5. The method of claim 2, further comprising decreasing the number of voice frames to be sent to the UE when the SINR measurement exceeds the predetermined frame assignment threshold.

6. The method of claim 2, further comprising increasing the number of voice frames to be sent to the UE when the SINR measurement is less than the predetermined frame assignment threshold.

7. The method of claim 3, further comprising decreasing the number of voice frames to be sent to the UE when the distance measurement is less than the predetermined frame assignment threshold.

8. The method of claim 3, further comprising increasing the number of voice frames to be sent to the UE when the distance measurement is greater than the predetermined frame assignment threshold.

9. A method of dynamic assignment of voice frames, the method comprising:

transmitting a radio frequency (RF) signal condition metric to a network element; and receiving a dynamically assigned number of voice frames based on a comparison of the RF signal condition metric with a predetermined frame assignment threshold.

10. The method of claim 9, wherein the predetermined frame assignment metric is a signal to interference and noise (SINR) measurement.

11. The method of claim 9, wherein the predetermined frame assignment metric is a measure of distance between a UE and the network element.

12. The method of claim 9, wherein the dynamically assigned number of voice frames is decreased if the RF signal condition metric exceeds the predetermined frame assignment threshold.

13. The method of claim 9, wherein the dynamically assigned number of voice frames is increased when the RF signal condition metric is less than the predetermined frame assignment threshold.

14. The method of claim 11, wherein the dynamically assigned number of voice frames is decreased when the distance measurement is less than the predetermined frame assignment threshold.

15. The method of claim 11, wherein the dynamically assigned number of voice frames is increased when the distance measurement is greater than the predetermined frame assignment threshold.

16. A non-transitory computer storage media storing computer-useable instructions that, when used by one or more processors, cause the processors to:

measure a radio frequency (RF) signal condition metric for a user equipment (UE);

compare the RF condition metric with a predetermined frame assignment threshold; and based on the comparing, dynamically assign a number of voice frames to be sent to the UE.

17. The non-transitory computer storage media of claim 16, wherein the predetermined frame assignment metric is a signal to interference and noise (SINR) measurement.

18. The non-transitory computer storage media of claim 16, wherein the predetermined frame assignment metric is a measure of distance between the UE and a network element.

19. The non-transitory computer storage media of claim 16, wherein the predetermined frame assignment metric is a measure of distance between the UE and a wide area network (WAN).

20. The non-transitory computer storage media of claim 16, further comprising dynamically increasing or decreasing the number of voice frames assigned to the UE based on the comparison.

* * * * *